United States Patent [19]

Parent

[11] Patent Number: 4,924,617

[45] Date of Patent: May 15, 1990

[54] HOOK SETTING DEVICE

[76] Inventor: Donald L. Parent, Rt. 1, Box 830, Karnack, Tex. 65661

[21] Appl. No.: 385,660

[22] Filed: Jul. 27, 1989

[51] Int. Cl.$^5$ ............................................. A01K 91/06
[52] U.S. Cl. ......................................... 43/15; 43/16; 43/17; 43/18.1
[58] Field of Search ................... 43/15, 16, 96, 97, 17, 43/18.1

[56] References Cited

U.S. PATENT DOCUMENTS

| | | | |
|---|---|---|---|
| 1,516,484 | 6/1924 | Meszaros | 43/16 |
| 1,996,704 | 1/1934 | Hawkinson | 43/16 |
| 2,504,822 | 10/1944 | Fritscher | 43/16 |
| 2,575,852 | 6/1946 | Trowbridge | 43/16 |
| 3,058,249 | 4/1960 | Krusbe | 43/16 |
| 4,492,053 | 1/1985 | Poulin | 43/15 |
| 4,620,387 | 11/1986 | Bloom | 43/15 |

Primary Examiner—Kurt Rowan
Assistant Examiner—Michael William Starkweather
Attorney, Agent, or Firm—John M. Harrison

[57] ABSTRACT

A hook setting device for securing a hook in a fish, which device includes a bifurcated frame having a lever pivotally secured in the frame bifurcation or slot, with one end of the lever secured to the bottom end of the frame by means of an elastic band and the opposite end of the lever receiving one end of a trigger line or cord. A trigger mechanism includes a ball attached to the trigger cord and adapted to seat in a ball seat located in the bottom end of the frame against the bias of the elastic band when the device is in cocked configuration. The top end of the frame is secured to a tree or other fixed support above a water body, in order to facilitate attaching a fishhook to the extending end of the trigger cord, baiting the fishhook, placing the fishhook in the water and setting the fishhook responsive to a fish taking the bait and tensioning the trigger cord to unseat the ball.

19 Claims, 1 Drawing Sheet

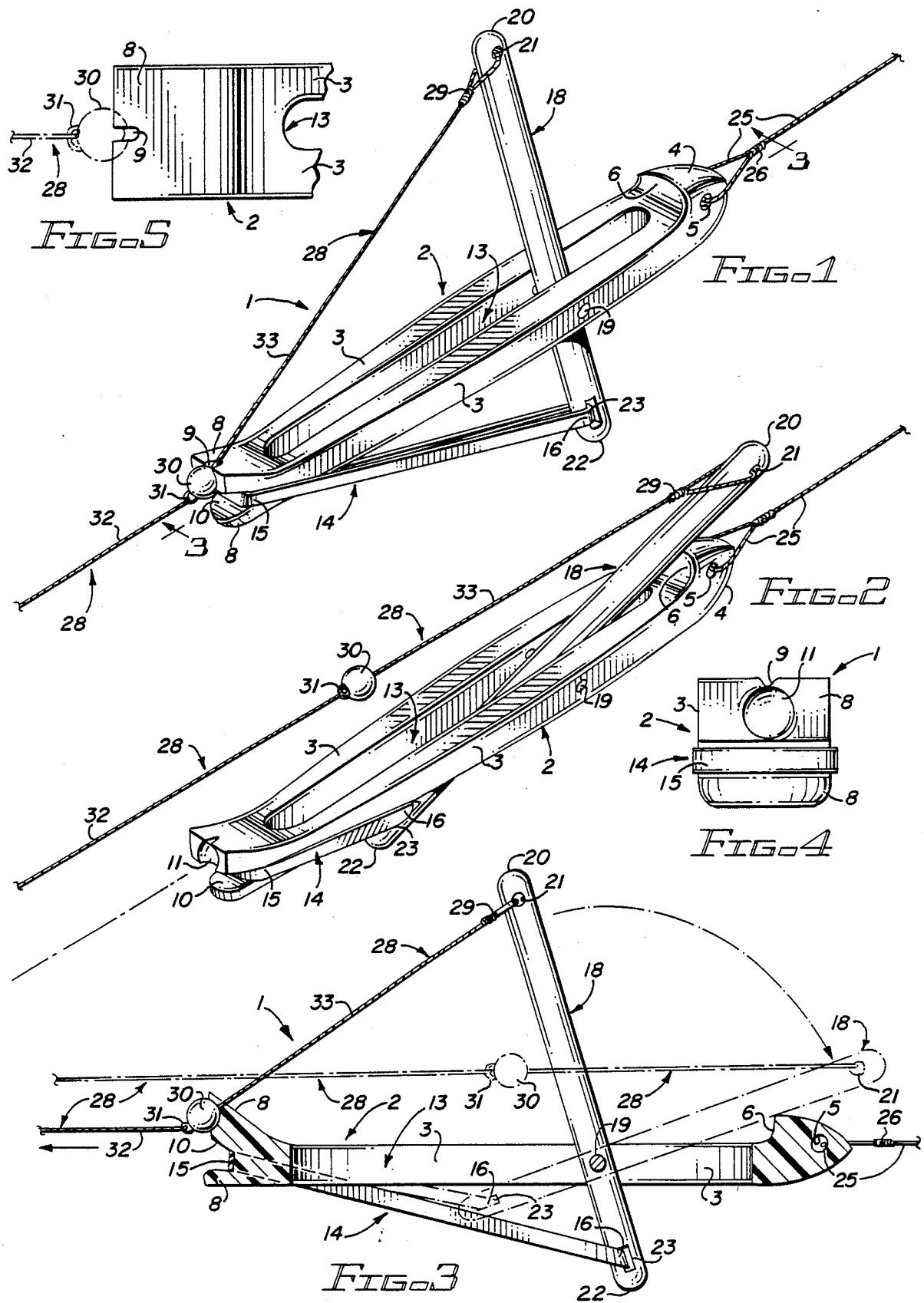

4,924,617

HOOK SETTING DEVICE

BACKGROUND OF THE INVENTION

Field of the Invention

This invention relates to automatic hook setting devices and more particularly, to a hook setting device for automatically setting the hook in a fish and preventing the escape of the fish in the absence of a fisherman. The hook setting device of this invention is characterized in a preferred embodiment by a bifurcated frame, one end of which is suspended from a tree or other fixed support above a water body and the opposite or bottom end fitted with a slot and a ball seat. A lever is pivotally secured to the frame in the frame bifurcation or slot near the top of the frame and an elastic band is stretched between one end of the lever and the slot located in the bottom end of the frame. The opposite end of the lever receives one end of a trigger cord, line or leader and the opposite end of the trigger cord is fitted with a fishhook for receiving bait and immersing in the water body. A ball or bead is secured to the trigger cord in spaced relationship with respect to the trigger end of the lever, such that the ball may be seated in the ball seat against the bias of the elastic band when the trigger end of the lever is pivoted downwardly, to locate the fishhook and bait in the water body pursuant to "cocking" of the hook setting device. Tension applied to the trigger cord responsive to taking of the bait by a fish unseats the ball from the ball seat and sets the hook in the fish responsive to abrupt upward movement of the trigger end of the lever by contraction of the elastic band. The fish is automatically "played" from the trigger end of the lever against the bias of the elastic band as it tensions the trigger cord.

A popular technique for taking game fish such as white perch or crappie and other game fish is by using automatic fishing devices such as the popular "Whites Auto Fisher", or "yoyo", and similar devices. The use of such automatic fishing devices facilitates high efficiency in catching fish in the absence of the fisherman by suspending the devices from tree limbs, posts and other objects located above the surface of a water body. Before the advent of such automatic fishing devices, and to some extent, even now, limb lines are commonly used to catch catfish and other species of game fish, which limb lines include a length of cord, one end of which is tied to an overhanging tree limb and the other end extending downwardly into the water, with a fishhook attached thereto for receiving bait. When the bait is taken by a fish, the resiliency of the limb acts as a fishing rod and serves to help engage the fishhook and maintain the fish on the fishhook. Automatic fishing devices are more efficient than the simple "limb lines", since the former devices serve to "set" the fishhook and also to "play" the fish against a spring-loaded or bias mechanism, in order to increase the incidence of engaging and maintaining the fish on the fishhook. However, many of these devices, including the "White's Auto Fisher", raise fish from the water, where they quickly die.

Fish such as white perch or crappie usually nibble at the bait and may even elevate the bait and the fishhook to remove the bait before the fisherman is aware that the fish is present. A sensitive trigger mechanism in an automatic fishing device decreases the likelihood of missing fish under these circumstances. Furthermore, the use of multiple automatic fishing devices serves to increase the catch, since the opportunity is presented for catching more fish over a selected period of time than is possible with a single fishhook. Moreover, automatic fishing devices can be used to catch fish during late evening or early morning hours when the fisherman is normally asleep and such fishing devices can be periodically rebaited at convenient time intervals to further increase the catch.

Typical of the fish setting devices known in the prior art is that disclosed in U.S. Pat. No. 3,660,922, dated May 9, 1972, to D. C. Chill. The Chill device includes a cylindrical housing containing a pressure spring, which housing is open at one end and has a notched lip at its opening. A thin, flexible leader passes through the opening of the housing and is connected to the spring at one end and to a fishhook at the opposite end. A small bead is held on the leader at a point remote from the notched lip when the spring is relaxed. The device is cocked by drawing the leader downwardly to seat the bead behind the notched lip and thereby maintain the device in the cocked state against the urging of the spring. U.S. Pat. No. 3,702,512, filed May 17, 1971, to Vincent B. Hodshire, details a "Fish Catching Instrumentality". The device includes means for selectively adjusting the tension on a dual set trigger lever mechanism to provide for variable release of a relay trigger lever fish-engaging member. The dual set trigger lever mechanism includes a trigger lever provided with first and second arm portions. The trigger lever is pivotally mounted to a frame on which the relay trigger lever fish-engaging member is mounted. In one aspect of the invention, resilient means adjustably engage the first arm of the trigger lever, while the second arm releasably retains the relay trigger lever fish-engaging member in a cocked position by adjusting the engagement between the resilient means and the first arm of the lever. In this manner, the tension required to release the relay trigger lever fish-engaging member can be varied. In another form of the invention, the resilient means may adjustably engage the second arm. U.S. Pat. No. 3,823,504, filed June 8, 1972, to Samuel M. Bybee, details a "Hook Setter Apparatus". The hook setter apparatus is designed to be secured to a support structure, in order to elevate the device over a water surface and includes means to activate a connected fishhook assembly to automatically hook a fish. The invention further details a hook setter apparatus having a housing and a connector operable to support the apparatus on a tree limb or the like and support a fishhook assembly attached to the lower end of the housing. The device is operable upon movement of the fishhook assembly to actuate the actuator means and provide spring tension to hook and hold a fish. An "Automatic Hook Setter" is detailed in U.S. Pat. No. 4,492,053, dated Jan. 8, 1985, to Gilles Poulin. The automatic hook setting device is designed for setting a fishhook in a fish responsive to a pull exerted by the fish on the line. When the fish pulls on the fishing line to pivotally move the front end of the line support member downwardly a distance exceeding a predetermined displacement, a trip element is moved to a release position and in turn, releases an elastic band tension member, so as to engage a fixed stop and cause the front end of the line support to jerk upwardly, thereby setting the hook in the fish. U.S. Pat. No. 4,807,384, filed July 31, 1987, to J. M. Roberts, details a "Fishing Rod Holder Having Dual Actuation Alarm". The patent includes a holder or portion for receiving and holding a rod, a mount element including a first mount member supportably attached to the holder portion, a second mount member for engaging a fixed support, the first mount member further including a housing for pivotally receiving the second mount member and a tension-adjusting means for adjusting the pivoting of the first mount member on the second mount member. An alarm switch is included inside the housing and is actuated by the pivoting of the first mount member on the second mount member.

It is an object of this invention to provide a hook setting device which is characterized by a bifurcated housing, a lever pivotally disposed in the housing bifurcation or slot, with one end of the lever biased to one end of the housing, a trigger cord, line or leader having one end secured to the opposite end of the lever and the opposite end of the trigger cord fitted with a fishhook for receiving bait and immersing in a water body and a trigger bead or ball adapted for engaging the housing in cocked configuration and unseating from the housing in release configuration to hook a fish.

It is an object of this invention to provide a hook setting device which will automatically set the hook in a fish without raising the fish from the water, thereby prolonging the life of the fish until the fisherman arrives.

Another object of the invention is to provide a new and improved hook setting device for automatically setting the hook in a fish, which device includes a bifurcated frame adapted for suspension from a tree limb or other support object above a water body, a lever pivotally secured in the longitudinal slot provided in the frame, with one end of the lever biased to the bottom end of the frame by means of a resilient band or cord and the opposite end of the lever receiving one end of a trigger cord or leader, the opposite end of the trigger cord being adapted for receiving a fishhook and extending beneath the surface of a water body, a ball seat provided in the bottom end of the frame and a ball fitted on the trigger cord, wherein downward pivoting of the trigger end of the lever against the bias of the resilient band or cord facilitates seating of the ball in the ball seat for "cocking" the hook setting device and location of the hook and bait beneath the surface of the water, and striking of the bait by a fish unseats the ball from the ball seat and forces the fishhook into the fish.

Yet another object of this invention is to provide an automatic hook setting device which is characterized by a bifurcated frame, a lever pivotally secured in the frame slot, with one end of the lever biased toward the bottom end of the frame by means of a resilient band and the opposite end of the lever receiving one end of a trigger cord containing a trigger mechanism and the opposite end of the trigger cord secured to a hook for receiving bait, wherein the bait and hook are located beneath the surface of the water when the trigger mechanism is set against the bias of the resilient band and the hook is driven into the fish responsive to striking of the bait by the fish and activating the trigger mechanism.

Still another object of the invention is to provide a new and improved hook setting device which is characterized by an elongated, bifurcated frame, one end of which is adapted for suspension from a tree branch or alternative support above a water body and the opposite end provided with a ball seat and a transverse slot for receiving one end of an elastic band, a lever pivotally secured in the longitudinal bifurcation or slot of the frame, with one end of the lever receiving the opposite end of the elastic band and the opposite end of the lever receiving one end of a trigger cord, the opposite end of which trigger cord is fitted with a fishhook for receiving bait and immersing in the water body and further including a ball or bead attached to the trigger cord, wherein the ball is seated in the ball seat when the lever is pivoted against the bias of the elastic band to "cock" the hook setting device and facilitate dislocation of the ball from the ball seat responsive to the strike of a fish and abruptly forcing the trigger end of the lever upwardly to set the fishhook in the fish.

SUMMARY OF THE INVENTION

These and other objects of the invention are provided in a new and improved hook setting device which is characterized by an elongated, longitudinally bifurcated frame provided with a support cord or line at one end for supporting the frame from a tree limb or other fixed object over a water body and a transverse slot and ball seat provided in the opposite end of the frame, with an elongated lever pivotally secured in the upper one-half of the frame bifurcation in off-center relationship, one end of which lever is secured to the bottom end of the frame by means of an elastic band or cord and the opposite end of the lever receiving one end of a trigger cord, the opposite end of which trigger cord is fitted with a fishhook for receiving bait and disposition beneath the surface of the water body. A ball or bead is attached to the trigger cord in spaced relationship with respect to the opposite end of the lever for removably seating in the ball seat responsive to pivoting of the lever in the frame bifurcation against the bias in the elastic band or cord and "cocking" the hook setting device, wherein release of the ball from the ball seat responsive to striking of the fish causes the trigger end of the lever to abruptly pivot upwardly responsive to the bias in the elastic band or cord, to set the fishhook in the fish and "play" the fish in the water body.

BRIEF DESCRIPTION OF THE DRAWING

The invention will be better understood by reference to the drawing, wherein:

FIG. 1 is a perspective view of a preferred embodiment of the hook setting device of this invention in "cocked" configuration;

FIG. 2 is a perspective view of the hook setting device illustrated in FIG. 1, with the hook setting device disposed in "triggered", hook-setting configuration;

FIG. 3 is a sectional view taken along line 3—3 of the hook setting device illustrated in FIG. 1;

FIG. 4 is a bottom view of the hook setting device illustrated in FIG. 2, with the pivoting lever removed for clarity; and FIG. 5 is a top sectional view of the bottom end of the frame of the hook setting device illustrated in FIG. 2, more particularly illustrating a preferred seating configuration for the ball element trigger mechanism.

DESCRIPTION OF THE PREFERRED EMBODIMENTS

Referring initially to FIGS. 2, 4 and 5 of the drawing, the hook setting device of this invention is illustrated in "triggered" or released configuration and is represented by reference numeral 1. The hook setting device 1 includes an elongated, bifurcated frame 2, defined by a pair of parallel frame members 3, having a longitudinal frame slot 13 therebetween and joined at the top end 4 and the bottom end 8 of the frame 2. The top end 4 is provided with a curved top end shoulder 6 and a top end opening 5 for receiving one end of a support cord 25, which is attached to the top end 4 of the frame 2 by means of a support cord knot 26. The support cord 25 is designed to suspend the hook setting device 1 from a tree limb or other support object (not illustrated) over a water body (not illustrated) containing fish, for fishing purposes. A line slot 9 is provided in the bottom end 8 of the frame 2 and a ball seat 11 is also configured in the bottom end 8 adjacent to the line slot 9, as illustrated in FIGS. 2 and 4. An elastic band slot 10 is further provided in the bottom end 8 of the frame 2 for receiving the frame end 15 of an elastic band 14, as further illustrated in FIGS. 2 and 4 of the drawing. An elongated lever 18 is pivotally secured in the bifurcation 13 of the frame 2 by means of a pivot pin 19, which is seated in the frame members 3 and projects through the bifurcation 13. In a preferred embodiment of the invention the point of pivot of the lever 18 in the frame 2 is closer to the top end 4 than to the bottom end 8 of the frame 2 and the lever 18 is pivoted in off-center relationship with respect to the trigger end 20 and the bias end 22 thereof, as further illustrated in FIG. 2. A trigger end opening 21 is provided in the trigger end 20 of the lever 18, while a bias end slot 23 is located in the bias end 22 of the lever 18. The lever end 16 of the elastic band 14 is extended through the bias end slot 23 and connects the bias end 22 of the lever 18 to the bottom end 8 of the frame 2. One end of a flexible trigger cord 28 is extended through the trigger end opening 21 of the trigger end 20 located in the lever 18, and is attached to the trigger end 20 by means of a trigger cord knot 29, as illustrated in FIG. 2. The opposite end of the trigger cord 28 receives a fishhook (not illustrated) for immersion in the water body during operational mode of the hook setting device 1, as hereinafter further described. A bead or ball 30 is secured to the trigger cord 28 in spaced, sliding relationship with respect to the trigger end 20 of the lever 18 and in a preferred embodiment of the invention, a ball knot 31 is located beneath the ball 30 to prevent the ball 30 from sliding downwardly on the trigger cord 28. Alternatively, it will be appreciated that the ball 30 can be otherwise fixedly mounted on the trigger cord 28 without the necessity of using the ball knot 31 for stabilizing the ball 30 on the trigger cord 28, according to the knowledge of those skilled in the art. That portion of the trigger cord 28 which is located between the trigger end 20 of the lever 18 and the ball 30 is defined as the trigger segment 33 of the trigger cord 28. Furthermore, that portion of the trigger cord 28 located between the ball 30 and the hook end (not illustrated) of the trigger cord 28, is defined as the set segment 32 of the trigger cord 28. As described above, in a most preferred embodiment of the invention the trigger end 20 segment of the lever 18 is longer than the bias end 22. This design reduces the tension in the trigger cord 28 which is necessary to dislocate the ball 30 from the ball seat 11 by a fish striking the submerged hook (not illustrated).

Referring now to FIGS. 1 and 5 of the drawing, the hook setting device 1 is "cocked" or set in fish-catching configuration by grasping the trigger segment 33 of the trigger cord 28 and forcing the trigger end 20 of the lever 18 downwardly against the bias of the elastic band 14. Pivoting of the lever 18 on the pivot pin 19 by extension of the set segment 32 of the trigger cord 28 downwardly is continued until the ball 30 approaches the ball seat 11 located in the bottom end 8 of the frame 2. The set segment 32 of the trigger cord 28 is then extended into the line slot 9 located in the bottom end 8 as the ball 30 is seated in the ball seat 11, in order to secure the lever 18 in pivoted configuration in the bifurcation 13 against the bias of the elastic band 14. The set segment 32 of the trigger cord 28 extends vertically downwardly and locates a fishhook (not illustrated), provided with suitable bait, beneath the surface of the water body. The hook setting device 1 is suspended from a tree limb or other suitable object by means of the support cord 25 and is now in configuration for setting the fishhook in a fish.

Referring now to FIG. 3 of the drawing, when a fish strikes the bait located on the fishhook which is attached to the extending end of the set segment 32 of the trigger cord 28, the trigger end 20 of the lever 18 is forced slightly downwardly in the direction of the arrow against the bias of the elastic band 14 due to the pull of the fish and the ball 30 is unseated from the ball seat 11. This action immediately applies the bias of the elastic band 14 to the trigger segment 33 and set segment 32 of the trigger cord 28, thereby abruptly forcing the trigger end of the lever 18 upwardly and setting the fishhook in the fish. Continuing pressure exerted by the fish against the trigger cord 28 causes the lever 18 to pivot in the bifurcation 13 against the bias of the elastic band 14 and tire the fish and the elasticity of the elastic band 14 prevents the fish from tearing the fishhook from its mouth or bending the fishhook.

It will be appreciated by those skilled in the art that the hook setting device of this invention is characterized by a simple, yet highly efficient expedient for catching fish under circumstances where the fisherman is not present. Furthermore, referring again to the drawing, the hook setting device 1 prevents fish from being pulled from the water before the fisherman arrives and can be adjusted to accommodate fish of varying size by simply adjusting the size and/or number of the elastic bands 14 utilized to apply tension to the trigger cord 28. For example, under circumstances where small white perch or other fish are to be taken, a single elastic band 14 of selected resiliency, such as a rubber band, can be used to connect the bias end 22 of the lever 18 to the bottom end 8 of the frame 2, in order to prevent the lever 18 from tearing the fishhook out of the fish's mouth when the fish strikes. In contrast, one or more heavy elastic or rubber bands 14 can be utilized in the same hook setting device 1 under circumstances where it is desired to catch large fish such as catfish or other species of fish using the hook setting device 1.

In a preferred embodiment of the invention, the frame 2 and the lever 18 of the hook setting device 1 are characterized by an injection-molded plastic material such as polyethylene and polypropylene, in non-exclusive particular, which can be formulated and fabricated according to the knowledge of those skilled in the art. However, it will be understood that alternative materials of construction, including fiberglass, metal, wood and other materials, by way of example, can also be used without departing from the spirit and scope of the invention. Furthermore, as heretofore described, the ball 30 can be characterized by a bead having a hole therein for receiving the trigger segment 33 of the trigger cord 28 or it may be a solid bead mounted on the trigger segment 33 by techniques which are well known to those skilled in the art.

In another preferred embodiment of the invention, under circumstances where the frame 2 is about $6\frac{3}{4}$ inches long, the lever 18 is about 5 inches in length and is secured in the frame slot 13 by the pivot pin 19 at a point about 2¼ inches from the top end of the frame 2 and about 1½ inches from the bias end 22 of the lever 18. Other sizes of the hook setting device 1 may be utilized, with the dimensions of the frame 2 and lever 18 chosen in the approximate proportions noted above and one or more elastic bands 14 used to tension the lever 18, as deemed appropriate.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A hook setting device for securing a fishhook in a fish, comprising frame means adapted for suspension above a water body, a lever pivotally carried by said frame means, bias means connecting one end of said lever to said frame means, a thin flexible member carrying a fishhook at one end for receiving bait, said thin flexible member having the opposite end thereof connected to the opposite end of said lever, and trigger means provided on said thin flexible member, said trigger means adapted to engage said frame means against the bias of said bias means to place said hook setting device in cocked configuration, whereby striking of the bait and the fishhook by a fish tensions said thin flexible member, disengages said trigger means from said frame means and sets the fishhook in the fish responsive to the tension in said bias means; said hook setting device comprising a ball seat provided in said frame means and wherein said trigger means further comprises a ball carried by said thin flexible member for seating in said ball seat and placing said hook device in said cocked configuration, wherein said ball is dislodged from said ball seat responsive to said striking of the bait and the fish hook by a fish.

2. The hook setting device of claim 1 wherein said bias means further comprises at least one elastic band.

3. The hook setting device of claim 1 wherein said bias means further comprises at least one elastic band.

4. The hook setting device of claim 1 wherein said frame means further comprises a bifurcated frame having a longitudinal frame slot and wherein said lever is pivotally disposed in said longitudinal frame slot.

5. The hook setting device of claim 4 wherein said bias means further comprises at least one elastic band.

6. The hook setting device of claim 4 further comprising a ball seat provided in one end of said frame and wherein said trigger means further comprises a ball carried by said thin flexible member for seating in said ball seat and placing said hook setting device in said cocked configuration, wherein said ball is dislodged from said ball seat responsive to said striking of the bait and the fishhook by a fish.

7. The hook setting device of claim 6 further comprising a support cord attached to the opposite end of said frame, a transverse slot provided in said one end of said frame and wherein said bias means further comprises at least one elastic band seated in said transverse slot.

8. A hook setting device for securing a hook in a fish, comprising an elongated, bifurcated frame provided with support means at one end thereof and having a longitudinal frame slot; a lever pivotally carried by said frame at a point in said longitudinal frame slot which is closer to said one end of said frame than the opposite end of said frame; bias means connecting one end of said lever to said frame; a ball seat provided in said opposite end of said frame; a thin flexible member having one end connected to the opposite end of said lever, wherein the opposite end of said thin flexible member is provided with a fishhook; and a ball carried by said thin flexible member for engaging said ball seat against the bias of said bias means when said hook setting device is placed in a cocked configuration, said ball disengaging said ball seat responsive to striking of the fishhook by a fish, for setting the fishhook in the fish responsive to operation of said bias means.

9. The hook setting device of claim 8 wherein said bias means further comprises at least one elastic band.

10. The hook setting device of claim 9 further comprising a transverse slot provided in said opposite end of said frame for receiving said elastic band.

11. The hook setting device of claim 8 further comprising an opening provided in said one end of said lever for receiving said bias means.

12. The hook setting device of claim 9 further comprising:
    (a) a transverse slot provided in said opposite end of said frame for receiving one end of said elastic band; and
    (b) an opening provided in said one end of said lever for receiving the opposite end of said elastic band.

13. The hook setting device of claim 8 further comprising pin means extending through said frame, said longitudinal frame slot and said lever and wherein said lever is pivotally disposed in said frame slot on said pin means in offset relationship, whereby the distance between said one end of said lever and said pin means is less than the distance between said opposite end of said lever and said pin means.

14. The hook setting device of claim 13 further comprising a transverse slot provided in said one end of said frame for receiving one end of said elastic band.

15. The hook setting device of claim 14 wherein said bias means further comprises at least one elastic band and said support means further comprises a thin flexible support member.

16. The hook setting device of claim 15 further comprising an opening provided in said one end of said lever for receiving one end of said elastic band.

17. A hook setting device for automatically securing a hook in a fish, comprising an elongated frame; a thin flexible support member attached to one end of said frame for suspending said frame over a water body; a longitudinal frame slot provided in said frame; an elongated lever extending through said longitudinal frame slot and a pin projecting transversely through said frame and said lever for pivotally securing said lever to said frame in said longitudinal frame slot; bias means connecting one end of said lever to the opposite end of said frame; a ball seat provided in said one end of said frame; a thin flexible trigger member having one end connected to the opposite end of said lever and the opposite end of said thin flexible trigger member provided with a fishhook; and a ball carried by said thin flexible trigger member for engaging said ball seat against the bias of said bias means when said hook setting device is placed in a cocked configuration, and disengaging said ball seat responsive to striking of the fishhook by a fish, for setting the fishhook in the fish responsive to the tension in said bias means.

18. The hook setting device of claim 17 wherein said longitudinal slot is located closer to said one end of said frame than said opposite end of said frame and said lever is disposed in said longitudinal frame slot in offset relationship, whereby the distance between said one end of said lever and said pin is less than the distance between said opposite end of said lever and said pin.

19. The hook setting device of claim 18 wherein said bias means further comprises at least one elastic band and further comprising a transverse slot provided in said opposite end of said frame for receiving one end of said elastic band.

* * * * *